United States Patent Office 2,918,085
Patented Dec. 22, 1959

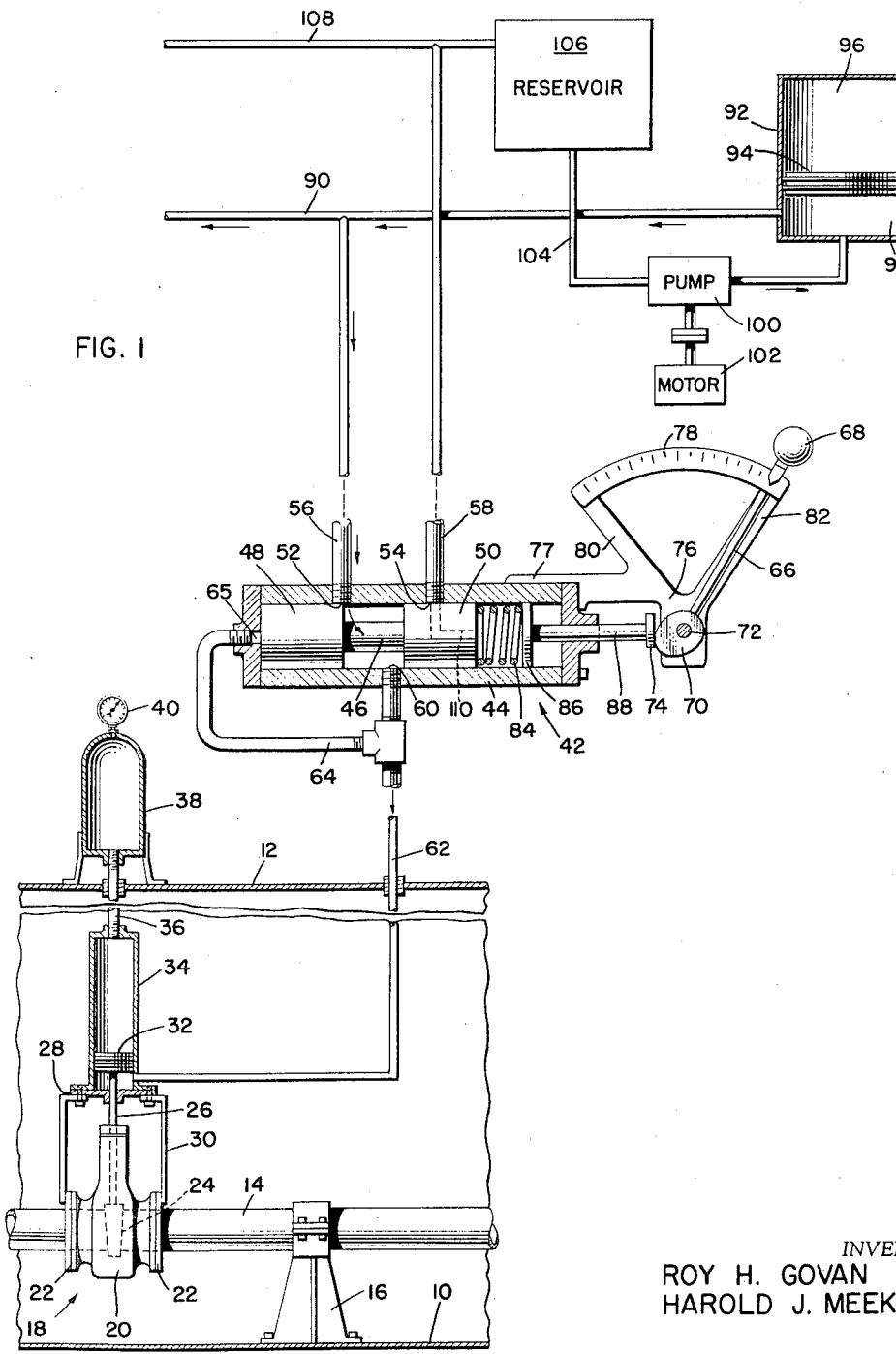

2,918,085

CONTROL SYSTEM FOR VALVES

Roy H. Govan, Hoboken, N.J., and Harold J. Meek, Staten Island, N.Y., assignors to Jaroco Engineering Co., Hoboken, N.J., a corporation of New Jersey Application May 23, 1956, Serial No. 586,795

3 Claims. (Cl. 137—557)

The present invention relates to a system for remotely controlling a valve. More particularly the present invention relates to hydraulic-pneumatic apparatus for remotely controlling the position of a valve located in a conduit and for indicating the relative position of the valve in the conduit.

The present invention has particular application in connection with marine vessels and particularly those vessels used for tanker purposes. It has been the usual practice in loading tankers with fluids such as gasoline, oil, etc., to pipe the fluid through conduits into the tanker receptacles which were located below the deck of the vessel. In these systems, block valves located in the fluid conduits communicating with the receptacles controlled the flow of the fluid being loaded and were manually operated, a mechanical linkage extending upwardly from the remotely positioned valve to a control station located on the deck of the vessel. It is seen that since each valve required a separate control station, the control stations necessarily being spaced some distance from each other, the loading operators had considerable difficulty in supervising the loading and unloading operations and in manipulating the valves manually.

Moreover, in the normal operating procedure in heretofore known hydraulic systems, the operator fully opened or fully closed the valve since there was no means available for indicating an intermediate position of the valve. However, it is frequently desirable to throttle the flow of fluid to load a predetermined quantity thereof into the tanker receptacles but this was not practical since there was no means for indicating the relative position of the valve in the conduit.

It is therefore an object of the present invention to provide a system for controlling a remotely positioned valve wherein the relative position of the valve is continuously indicated.

Another object of the present invention is to provide a control system for a remotely positiond valve for use in marine vessels wherein a hydraulic servo-motor is provided for controlling the operation of the valve.

Still another object of the present invention is to provide a pneumati-hydraulic system for controlling the operation of a remotely positioned valve and for continuously indicating the relative position of the valve.

Still another object of the present invention is to provide a hydraulically operated control valve for controlling the operation of a remotely positioned valve for use in marine vessels.

Still another object of the present invention is to provide a hydraulic-pneumatic indicating system for indicating the position of a valve, the indicator being located at a convenient control station.

Other objects of the nature and advantages of the instant invention will be apparent from the following description taken in conjunction with the accompanying drawing wherein:

Fig. 1 diagrammatically illustrates the pneumatic-hydraulic indicating and control system embodied herein, the control means therefore being located above deck of a marine vessel and a remotely positioned valve being located in a fluid conduit extending into the hold of the vessel.

The present invention generally, includes a hydraulic-pneumatic system for controlling the operation of a valve that is positioned in a fluid conducting conduit located in the hold of a marine tanker.

The system incorporates a servo-valve that controls the flow of motive fluid to a valve actuating piston, the piston being positioned in a pneumatic cylinder. Gas under pressure in the cylinder urges the piston to a valve closing position and acts to restrain movement of the piston in the valve opening operation. A second cylinder communicates with the first cylinder and in the valve opening operation, the gas under pressure compresses the gas in the second cylinder to produce an increased pressure thereof that may be indicated on a gauge conveniently connected to the second cylinder. By suitably calibrating the gauge, the indication of the pressure of the gas in the second cylinder will indicate the relative position of the valve in the conduit.

The present invention further includes an alternative indicating means which may be used in conjunction with the pneumatic pressure indicator. The additional indicator includes the control handle for the servo-valve, the pivotal movement of the handle being directly proportional to the linear movement of the valve actuating piston. Thus, by calibrating a suitable scale, the movement of the control handle with respect to the scale will give an accurate position of the remotely controlled valve.

Referring now to the drawing, the shell of the marine vessel or tanker into which a fluid, such as gasoline, oil, or the like is adapted to be directed, is indicated at 10, and the deck of the vessel is indicated at 12, the space between the shell 10 and the deck 12 being generally known as the ship's hold. Extending into the hold of the ship is a fluid conduit 14 that is adapted to convey the fluid to be transported to the tanks or receptacles located in the ship's hold. As shown, the fluid conduit 14 is supported by a standard 16 mounted on the shell 10 and it is understood that any number of standards may be employed to adequately support the fluid conduit 14.

Positioned at some convenient point in the conduit 14 and preferably located adjacent a point of entry into a fluid receptacle or tank, is an actuating valve assembly generally indicated at 18. The valve assembly 18 includes a valve body 20 which has flanges 22 integrally formed thereon, the flanges 22 being secured to similar flanges formed on the fluid conduit 14. Located within the valve body 20 is an actuating valve 24 of any suitable design, the valve 24 being adapted to be reciprocated into and out of communication with the bore of the fluid through the conduit 14. Connected to the valve 24 and extending upwardly therefrom through the valve body 20 is a valve stem 26. The valve stem 26 extends through a bearing plate 28 that is mounted on a frame 30, the frame 30 being suitably secured to the valve assembly 18. Secured to the uppermost end of the stem 26 is a piston 32 that is slidably positioned in a cylinder 34, the cylinder 34 being seated on the bearing plate 28 and firmly bolted to the frame 30. Communicating with the cylinder 34 in a pipe 36 that extends through the deck 12 of the ship and into the interior of an upper tank 38. The upper tank 38 is mounted on the deck 12 at a control station and has a gauge 40 communicating with the interior thereof, the gauge 40 indicating the pressure of a gas that is located in the tank 38 and cylinder 34. The gas under pressure in the tank 38 and cylinder 34 may be nitrogen or the like and has a constant predetermined pressure when the piston 32 is located in the lowermost position as shown in the drawing. The pressure of the gas is normally sufficient to urge the piston 32 downwardly thereby retaining the valve 24 in a closed position in the conduit 14. It is seen that movement of the piston upwardly within the cylinder 34 will compress the gas under pressure therein and in the deck mounted tank 38. Since the pressure of the gas varies inversely with respect to the volume it occupies, the gauge 40 may be calibrated accordingly, and an indication of the position of the piston 32 in the cylinder 34 may be determined. Since the valve 24 is connected directly to the piston 32, an accurate indication of the valve will be continuously indicated on the gauge 40 as the position of the piston is varied.

In order to move the piston 32 upwardly against the action of the pressurized gas in the cylinder 34, thereby opening the valve 24, a control valve is provided and is generally indicated at 42. The control valve 42 includes a cylinder 44 that has a spool 46 slidably positioned therein, the spool 46 having lands 48 and 50 formed thereon. Formed in the walls of the cylinder 44 of the control valve 42 are ports 52 and 54, the inlet port 52 communicating with a fluid inlet conduit 56 and the outlet port 54 communicating with a fluid exhaust conduit 58. A third port 60 is formed in the wall of the cylinder 44 opposite the ports 52, 54 and communicates with a combination fluid delivery and exhaust line 62. The fluid line 62 further communicates with the lower end of the cylinder 34 below the piston 32 through a suitable port formed in the wall of the cylinder 34. The fluid line 62 thereby conducts hydraulic motive fluid to and from the cylinder 34, the motive fluid contacting the lowermost end of the piston 32 as seen in the drawing. A feed back or pressure sensing fluid line 64 is joined to the fluid line 62 and communicates through a port 65 with the interior of the cylinder 44 at the left end of the land 48 as seen in the drawing, and is adapted to move the spool 46 to a neutral position as will be more fully described hereinafter.

The movement of the spool 46 is controlled by a manually operated lever 66, the upper end of which has a hand knob 68 formed thereon and the lower end of which has a cam 70 secured thereto. The cam 70 is rotatably mounted on shaft 72 and is continuously engaged by a follower 74 that is responsive to the rotation thereof. The shaft 72 is fixed in the lower portion of a quadrant 76 that includes an extension 77 suitably bolted to the cylinder 44, thereby anchoring the quadrant 76 to the control valve 42. An arcuate scale 78 is secured to arms 80, 82 of the quadrant and the lever 66 includes an offset pointer 82 that overrides the scale 78 thereby indicating the position of the lever 66 and consequently the valve 24 as will hereinafter be described.

The follower 74 is biased into engagement with the cam 70 by a coil spring 84 that is located in the cylinder 44 abutting against the land 50 and a movable piston 86. Secured to the piston 86 is a piston rod 88 that extends through an end wall of the cylinder 44 and that has the follower 74 secured to the outermost end thereof. It is seen that the follower 74 is urged into engagement with the cam 70 and that rotation of the cam will result in movement of the shaft 88, piston 86 and spool 46.

In order to introduce motive fluid into the control valve 42, the fluid conduit 56 is connected to an inlet header 90. The inlet header 90 is adapted to be operatively connected to any suitable number of similar hydraulic systems depending upon the number of valve assemblies 18 that are located in the fluid conduit lines extending through the hold of the ship. The fluid inlet header 90 communicates with a hydraulic accumulator 92 that is adapted to provide a continuous supply of motive fluid under pressure to the control valve 42. Located in the accumulator is a floating piston 94 that divides the accumulator into an upper chamber 96 and a lower chamber 98. The upper chamber 96 of the hydraulic accumulator 92 is adapted to be supplied with a gas medium under pressure, such as nitrogen, thereby precharging the upper chamber to a predetermined pressure. The lower chamber 98 is adapted to have introduced therein the hydraulic motive fluid which is directed thereto by a variable displacement pump 100. The pump 100 is driven by a motor 102 and is provided with a pressure holding device, whereby when the pressure of fluid in the chamber 98 reaches a predetermined amount, depending upon the precharged pressure of the medium in the chamber 96, the pump 100 will float on the line, that is, it will not continue to pump motive fluid into the chamber 98. When the pressure of the chamber 98 falls below the predetermined pressure, the pressure holding device will then respond to cause the pump 100 to operate to supply the necessary amount of fluid to the chamber 98 until the predetermined pressure therein is again reached. The pressure holding device will then operate to cause the pump to once more float on the line. Communicating with the pump 100 through a fluid line 104 is a reservoir 106 which receives the discharge fluid from the exhaust line 58 by way of a fluid line 108, the fluid line 108 also communicating with other similar hydraulic systems throughout the ship.

In the operation of the device, when it is desired to control the movement of the valve 24, thereby controlling the flow of fluid through the conduit 14, the operator moves the lever 66 to the right toward the position shown in the drawing, thereby compressing the spring 84 and moving the spool 46 to the left. The land 48 is moved sufficiently to the left to uncover port 52 thereby providing communication between inlet conduit 56 and the fluid line 62. The land 50 in this position covers the port 54 and prevents escape of any motive fluid to the discharge line 58. Motive fluid under pressure is thus directed from the accumulator 92 through lines 90, 56 and 62 into the cylinder 34 below the piston 32 and exerts sufficient pressure to lift the piston 32 thereby opening the valve 24 and providing for fluid flow through conduit 14.

It is seen that since the pressure of a gas varies inversely with the volume it occupies, the gauge 40 will reflect the increasing pressure of the gas in the cylinders 34 and 38 as the piston 32 is moved upwardly in the cylinder 34. The gauge 40 may thus be calibrated to accurately indicate the relative position of the piston 32 and consequently the valve 24.

As the gas in the upper portion of the cylinder 34 and the tank 38 is compressed by the moving piston 32, a back pressure is created in the fluid line 62 and is reflected in the pressure sensing or feed back line 64. When the preselected pressure in the lines 62 and 64 is reached, the preselected pressure being determined by the degree of rotation of the lever 66, cam 70, and compression of the spring 84, the motive fluid in the pressure sensing line 64 forces the spool 46 to the right, as seen in the drawing, a sufficient amount to cause the land 48 to block the port 52 thereby cutting off the flow of the motive fluid from the accumulator. The spool 46 is restrained from further movement to the right, once the inlet port 52 is closed, by the spring 84. The outlet port 54 thus remains covered and the line 62 is placed in a static condition, the control system thereby being located in a neutral position. The piston 32, in the neutral position, remains at the point to which it was moved by the motive fluid and thus retains the valve 24 in the corresponding position. It is seen, therefore, that the flow of fluid through the conduit may be throttled as desired by controlling the flow of motive fluid to the cylinder 34 by means of the control valve 42. Thus, any desired pressure may be maintained in fluid line 62 by the simple manipulation of lever 66, the degree of pressure in the line 62 reflecting a degree of opening of the valve 24.

As seen in the drawing, the lever 66 has been moved completely to the right which defines the fully open position of the valve 24. The spring 84 has been compressed sufficiently to restrain movement of the spool to the neutral position until the valve 24 has reached the open position. At this point the increased pressure of the gas in the tank 38 and consequently, the fluid pressure in lines 62 and 64, is sufficient to overcome the spring 84 and the spool is returned to the neutral position. As shown in the drawing, the land 50 is provided with a bleed line 110 which provides for exhaust of any fluid that may escape behind the land 50 in the space occupied by the coil spring 84.

It is also understood that by changing the precharge of the gas in the tank 38, the pressure in the line 62 necessary to actuate the piston 32 will necessarily be changed. The precharge of the gas in the tank 38 will therefore determine at what point the spool 46 will be returned to the neutral position, since the return movement of the spool is dependent on the back pressure built up in the pressure sensing line 64.

In the neutral position, the piston 32 will remain in the position to which it had been lifted until the operator again moves the handle or lever 66. It is seen, therefore, that the position of the lever 66 also reflects the position of the valve 24 and this indicator may be used to supplement the pneumatic gauge connected to tank 38. The operator will thus have a visual aid as he moves the lever 66 to detect or indicate the position of the valve 24, thereby enabling the valve 24 to be closely regulated.

The tank 38 and other similar tanks may be mounted on the deck of the ship at a point remote from the operator of the control valve 42, but at some strategic vantage point to enable a coordinator of the loading operation to see at a glance the position of the various valves in the conduits being controlled.

It is understood from the nature of the system described, that if the supply of the motive fluid fails or is released, or if the pressure of the motive fluid falls, the precharge of the gas in the tank 38 will be sufficient to close the valve 24 thereby blocking the conduit 14.

It will be obvious to those skilled in the art that various changes may be made without departing from the spirit of the invention and therefore, the invention is not limited to what is shown in the drawings and described in the specification, but only as indicated in the appended claims.

What is claimed is:

1. In a system for remotely controlling the position of a valve in a conduit, comprising a valve housing having a valve therein, a cylinder having a piston therein operatively connected to said valve, said piston being subjected to a predetermined charge of gas on one side thereof and to a variable pressure of hydraulic fluid on the other side thereof, the pressure of said gas on said piston moving said piston in a valve closing direction, and the pressure of said hydraulic fluid moving said piston in a valve opening direction, and control means in fluid communication with said other side of said piston for controlling said variable hydraulic pressure to move said piston and said valve to a desired position, said control means including a control valve casing having ports therein for supplying and exhausting pressure fluid to and from said fluid communication with said other side of said piston and having a movable spool disposed therein, means for shifting said spool to a fluid inlet position thereby enabling said hydraulic fluid to contact said piston, and a fluid line from said fluid communication for said control means communicating with a fluid pressure responsive portion of said spool valve for moving said spool to a neutral position in opposition to said spool shifting means, thereby cutting off flow of said fluid to said piston, said shifting means further movable to allow said spool to be moved to an exhaust position for releasing said fluid from contact with said piston, said valve thereby closing in response to pressure of said gas on said piston.

2. In a system for remotely controlling the position of a valve in a conduit, a servo-motor operatively connected to said valve, pneumatic means communicating with said servo-motor for urging said valve to a closing position, hydraulic means communicating with said servo-motor for urging said valve to an open position in opposition to said pneumatic means, said hydraulic means including a fluid conduit and a control valve for controlling the flow of hydraulic fluid through said fluid conduit and into said servo-motor, said control valve comprising a cylinder housing a movable spool positioned therein, said housing having ports for supplying and exhausting fluid to and from said hydraulic means through said fluid conduit, said spool cooperating with said ports for controlling the flow of a hydraulic fluid through said control valve, means for moving said spool to a position for supplying pressure fluid to said hydraulic means, spring means in said cylinder housing between said spool moving means and said spool for normally biasing said spool to a predetermined position, and a fluid line providing communication between said fluid conduit and a pressure responsive portion of said spool for urging said spool against the action of said spring to the predetermined position thereof, the pressure of the fluid in said fluid line being determined by the difference in pressure between said pneumatic means and said hydraulic means.

3. In a system for remotely controlling the position of a valve in a conduit, a servo-motor operatively connected to said valve and including a piston, pneumatic means having a pneumatic medium disposed therein communicating with one side of said piston for urging said valve to a closed position, hydraulic means communicating with the other side of said piston for urging said valve to an open position in opposition to said pneumatic means, said hydraulic means including a fluid conduit and a control valve for controlling the flow of a hydraulic fluid through said fluid conduit and into said servo-motor, said control valve including a housing, a movable spool disposed in said housing, fluid inlet and discharge ports formed in said housing, means for moving said spool to control ingress and egress of said hydraulic fluid through said ports and into and out of said fluid conduit, and a fluid line providing communication between said fluid conduit and a pressure responsive portion of said spool, said fluid line conducting fluid from said fluid conduit into engagement with the pressure responsive portion of said spool for urging said spool to a controlling position thereof in opposition to said spool moving means, the pressure of the fluid in said fluid line being determined by the difference in pressure between the pneumatic medium disposed on one side of the servo-motor piston and the hydraulic fluid located on the other side of the servo-motor piston.

References Cited in the file of this patent
UNITED STATES PATENTS

| | | |
|---|---|---|
| 899,029 | Connet | Sept. 22, 1908 |
| 915,204 | Montgomery | Mar. 16, 1909 |
| 957,511 | Lockwood | May 10, 1910 |
| 1,341,319 | Hodges | May 25, 1920 |
| 2,060,723 | Brisacher | Nov. 10, 1936 |
| 2,088,261 | Dienenthal | July 27, 1937 |
| 2,243,074 | Anderson | May 27, 1941 |
| 2,313,438 | Hoelscher | Mar. 9, 1943 |
| 2,598,258 | Hoffman | May 27, 1952 |
| 2,627,249 | Bryant | Feb. 3, 1953 |
| 2,750,862 | Garmager | June 19, 1956 |